US012688083B2

(12) United States Patent
Wang et al.

(10) Patent No.: US 12,688,083 B2
(45) Date of Patent: Jul. 21, 2026

(54) INTELLIGENT RECOMMENDATION OF TIME SERIES ANOMALY DETECTION MODEL PIPELINES

(71) Applicant: International Business Machines Corporation, Armonk, NY (US)

(72) Inventors: Jun Wang, Xi'an (CN); Jing Xu, Xi'an (CN); Xiao Ming Ma, Xi'an (CN); Xue Ying Zhang, Xi'an (CN); Si Er Han, Xi'an (CN); Jing James Xu, Xi'an (CN); Wen Pei Yu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 18/368,656

(22) Filed: Sep. 15, 2023

(65) Prior Publication Data

US 2025/0094267 A1     Mar. 20, 2025

(51) Int. Cl.
G06F 11/00 (2006.01)
G06F 11/07 (2006.01)

(52) U.S. Cl.
CPC ........ G06F 11/079 (2013.01); G06F 11/0709 (2013.01)

(58) Field of Classification Search
None
See application file for complete search history.

(56) References Cited

U.S. PATENT DOCUMENTS

| | | | |
|---|---|---|---|
| 2018/0053114 A1* | 2/2018 | Adjaoute | G06N 3/02 |
| 2020/0182995 A1* | 6/2020 | Zeng | G01S 13/003 |
| 2023/0177030 A1 | 6/2023 | Beaver et al. | |

FOREIGN PATENT DOCUMENTS

| | | | |
|---|---|---|---|
| FI | 20205605 A1 * | 12/2021 | H04L 41/0873 |

OTHER PUBLICATIONS

Mel, et al. "The NIST Definition of Cloud Computing". Recommendations of the National Institute of Standards and Technology. Nov. 16, 2015.
Goswami, et al., " Unsupervised Model Selection For Time-Series Anomaly Detection" https://arxiv.org/abs/2210.01078, Jan. 24, 2023.
IBM, " Creating a time series anomaly prediction (Beta)", Jul. 2023.
Buda, et al., "DeepAD: A Generic Framework Based on Deep Learning for Time Series Anomaly Detection", https://www.researchgate.net/publication/325840218, Jun. 2018.
Ying, et al., "Automated Model Selection for Time-Series Anomaly Detection", https://arxiv.org/abs/2009.04395, Aug. 2020.
Ye, et al., "An adaptive approach for anomaly detector selection and fine-tuning in time series", https://arxiv.org/abs/1907.07843, Jul. 2019.
Gonzalez, et al., "Steps towards continual learning in multivariate time-series anomaly detection using variational autoencoders", IMC '22: Proceedings of the 22nd ACM Internet Measurement Conference, pp. 774-775, Oct. 2022.

* cited by examiner

*Primary Examiner* — Tuankhanh D Phan
(74) *Attorney, Agent, or Firm* — Anthony Curro

(57)     ABSTRACT

A time series anomaly detection method, system, and computer program product that processes time series data includes absorbing profiles of the time series data and anomaly types of a model as features, optimizing biased ranks to create optimized ranks through merging initial ranks with new ranks generated by real anomalies, and auto-suggesting the optimized ranks for saving a predetermined amount of data operation.

15 Claims, 9 Drawing Sheets

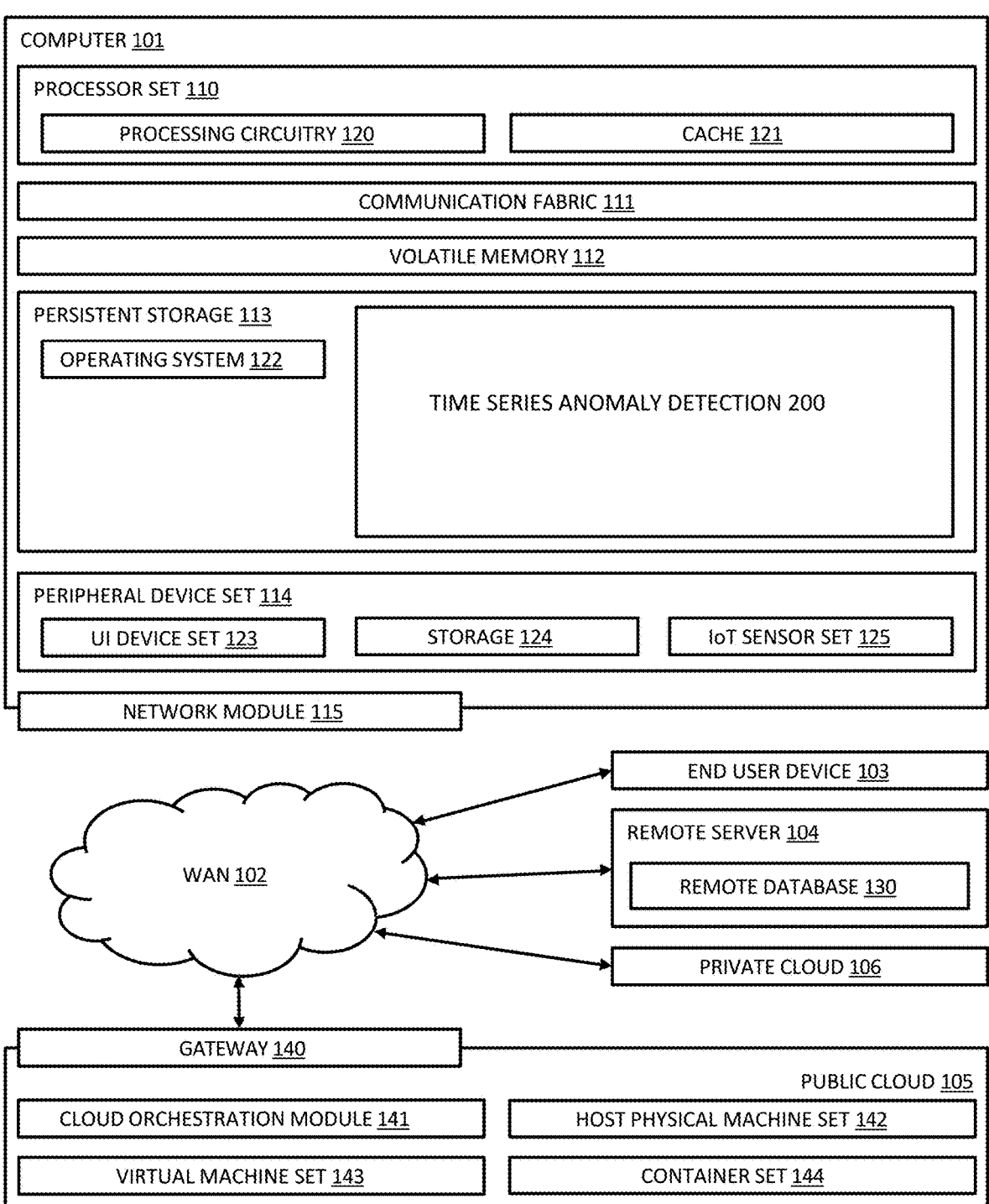

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

TIME SERIES ANOMALY DETECTION 200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

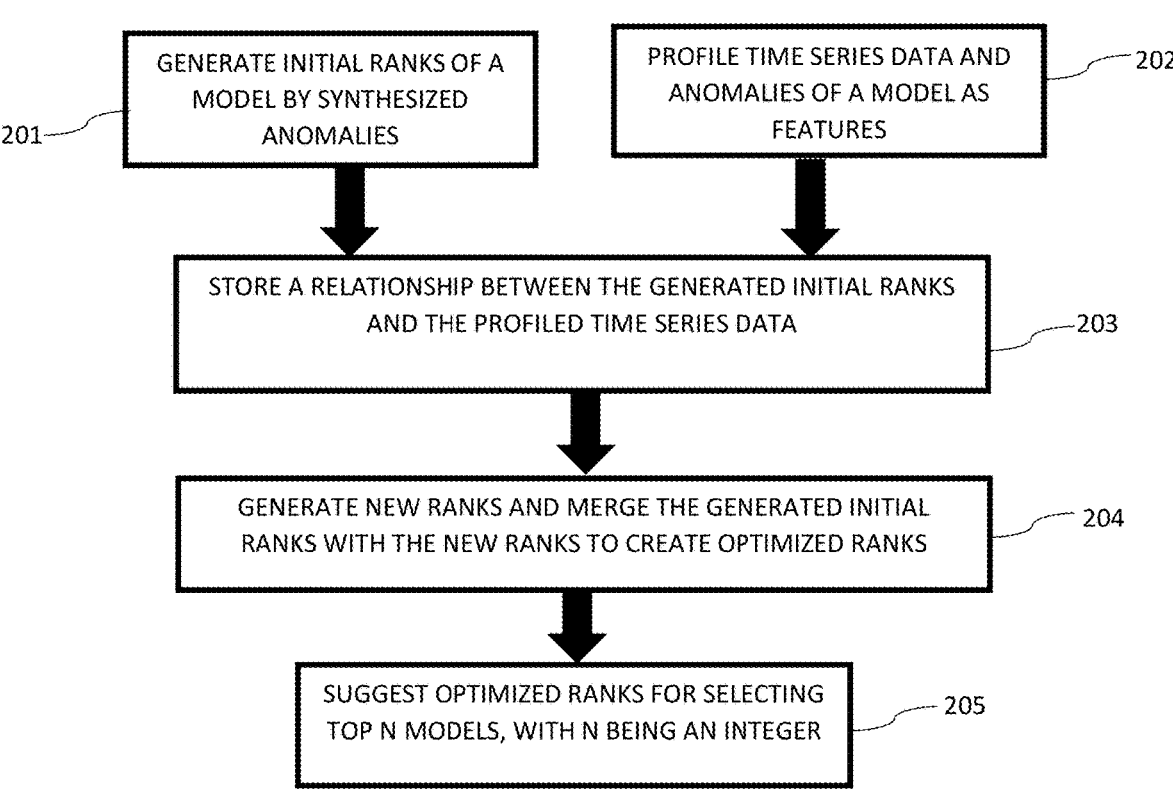

201 — GENERATE INITIAL RANKS OF A MODEL BY SYNTHESIZED ANOMALIES

PROFILE TIME SERIES DATA AND ANOMALIES OF A MODEL AS FEATURES — 202

STORE A RELATIONSHIP BETWEEN THE GENERATED INITIAL RANKS AND THE PROFILED TIME SERIES DATA — 203

GENERATE NEW RANKS AND MERGE THE GENERATED INITIAL RANKS WITH THE NEW RANKS TO CREATE OPTIMIZED RANKS — 204

SUGGEST OPTIMIZED RANKS FOR SELECTING TOP N MODELS, WITH N BEING AN INTEGER — 205

Figure 3:
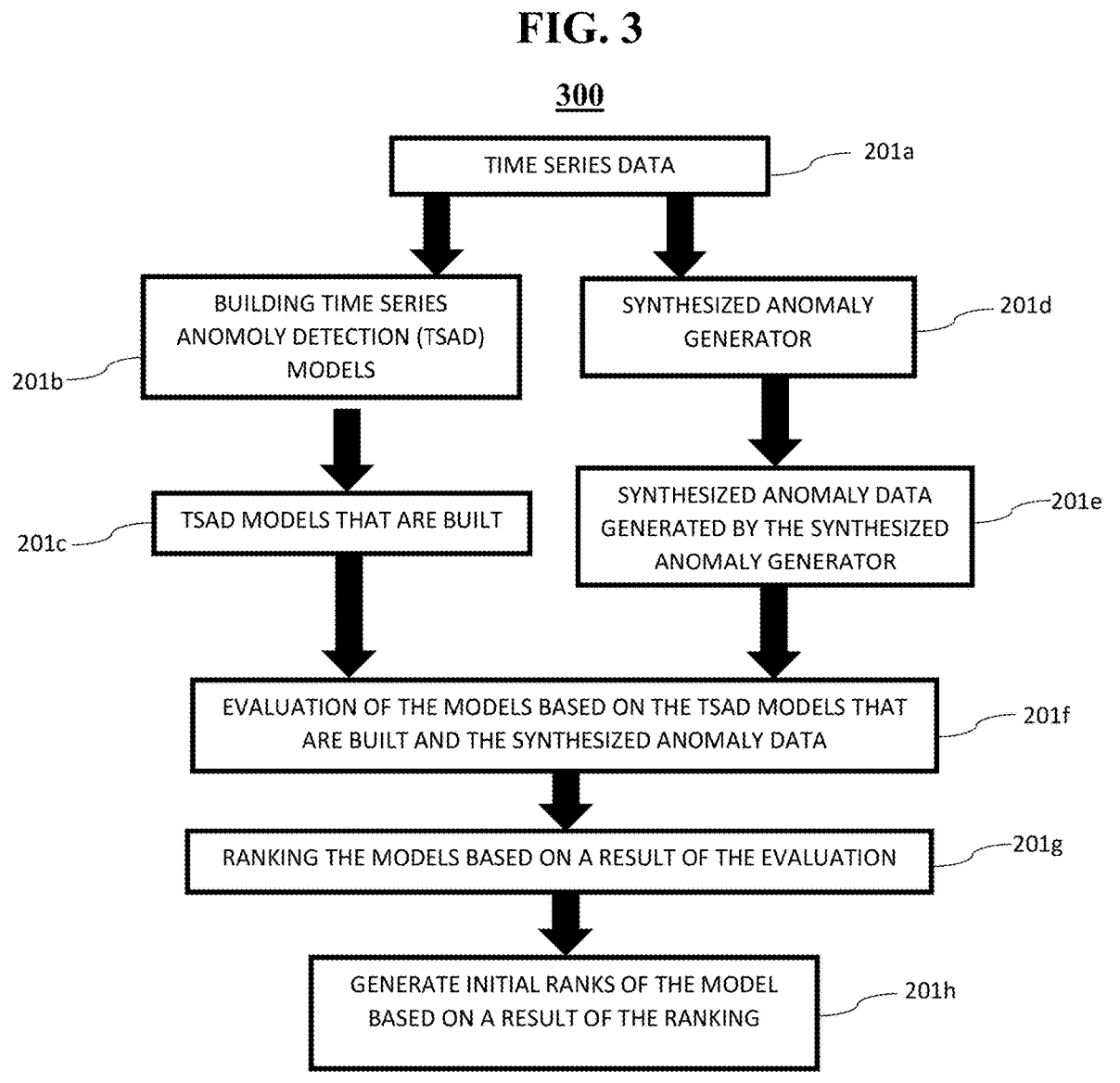

```
                    ┌──────────────────────────────┐
                    │      TIME SERIES DATA         │────── 201a
                    └──────────────────────────────┘
                         │                    │
                         ▼                    ▼
        ┌─────────────────────┐    ┌─────────────────────┐
        │   BUILDING TIME      │    │  SYNTHESIZED ANOMALY │────── 201d
        │ SERIES ANOMOLY       │    │     GENERATOR        │
        │ DETECTION (TSAD)     │    └─────────────────────┘
        │     MODELS           │
        └─────────────────────┘
  201b
```

TIME SERIES DATA — 201a

BUILDING TIME SERIES ANOMOLY DETECTION (TSAD) MODELS — 201b

SYNTHESIZED ANOMALY GENERATOR — 201d

TSAD MODELS THAT ARE BUILT — 201c

SYNTHESIZED ANOMALY DATA GENERATED BY THE SYNTHESIZED ANOMALY GENERATOR — 201e

EVALUATION OF THE MODELS BASED ON THE TSAD MODELS THAT ARE BUILT AND THE SYNTHESIZED ANOMALY DATA — 201f

RANKING THE MODELS BASED ON A RESULT OF THE EVALUATION — 201g

GENERATE INITIAL RANKS OF THE MODEL BASED ON A RESULT OF THE RANKING — 201h

```
"supporting_rank": {
    "average_precision":
        "LevelShift": {
            "P1": 2.0,
            "P2": 2.0,
            "P4": 2.0,
            "P5": 4.0,
            "P6": 5.0,
            "P3": 6.0
        },
        "LocalizedExtreme": {
        },
        "Trend": {
        },
        "Variance": {
        }
```

| is_LocalizedExtreme | is_LevelShift | is_Variance | is_Trend |
|---|---|---|---|
| 1 | 0 | 0 | 0 |
| 0 | 1 | 0 | 0 |
| 1 | 0 | 0 | 0 |

INTELLIGENT RECOMMENDATION OF TIME SERIES ANOMALY DETECTION MODEL PIPELINES

BACKGROUND

The present invention relates generally to a time series anomaly detection method, and more particularly, but not by way of limitation, to a system, method, and computer program product to intelligently recommend time series anomaly detection model pipelines.

Detecting anomalous subsequences in time series data becomes more and more important and widely used in all walks of life. An anomaly can indicate momentous events, such as system defects, production faults, delivery bottlenecks, or heart flicker, and is therefore of central interest.

SUMMARY

In an exemplary embodiment, the present invention can provide a computer-implemented time series anomaly detection method that processes time series data, the method including absorbing profiles of the time series data and anomaly types of a model as features, optimizing biased ranks to create optimized ranks through merging initial ranks with new ranks generated by real anomalies, and auto-suggesting the optimized ranks for saving a predetermined (large) amount of data operation.

In another exemplary embodiment, the present invention can provide a time series anomaly detection computer program product that processes time series data, the time series anomaly detection computer program product comprising a computer-readable storage medium having program instructions embodied therewith, the program instructions executable by a computer to cause the computer to perform: absorbing profiles of the time series data and anomaly types of a model as features, optimizing biased ranks to create optimized ranks through merging initial ranks with new ranks generated by real anomalies, and auto-suggesting the optimized ranks for saving a predetermined (large) amount of data operation.

In another exemplary embodiment, the present invention can provide a time series anomaly detection system that processes time series data, the time series anomaly detection system including a processor; and a memory, the memory storing instructions to cause the processor to perform: absorbing profiles of the time series data and anomaly types of a model as features, optimizing biased ranks to create optimized ranks through merging initial ranks with new ranks generated by real anomalies, and auto-suggesting the optimized ranks for saving a predetermined (large) amount of data operation.

In another exemplary embodiment, the present invention can include, based on the time series data, the initial ranks of the model are generated during the absorbing.

In another exemplary embodiment, the present invention can include that the profiles include profiling the time series data of the model and the anomaly types by generating synthesized anomaly data.

In another exemplary embodiment, the present invention can include during the optimizing, a relationship between the generated initial ranks and the profiled time series data of the model is stored.

In another exemplary embodiment, the optimized ranks are utilized for selecting top N models, where N is an integer and can be set by a user.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes (and others) of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 depicts a computing environment 100 according to an embodiment of the present invention;

FIG. 2 exemplarily shows a high-level flow chart for a time series anomaly detection method 200 according to an embodiment of the present invention;

FIG. 3 exemplarily depicts a high-level flow chart for step 201 of the method 200 according to an embodiment of the present invention;

FIG. 4 exemplarily depicts a rank example according to a result of step 201 of method 200 according to an embodiment of the present invention;

FIG. 7 exemplary depicts pre-defined anomaly types according to an embodiment of the present invention;

FIG. 8 exemplarily depicts a high-level flow chart for step 204 of the method 200 according to an embodiment of the present invention.

DETAILED DESCRIPTION

Figure 5:
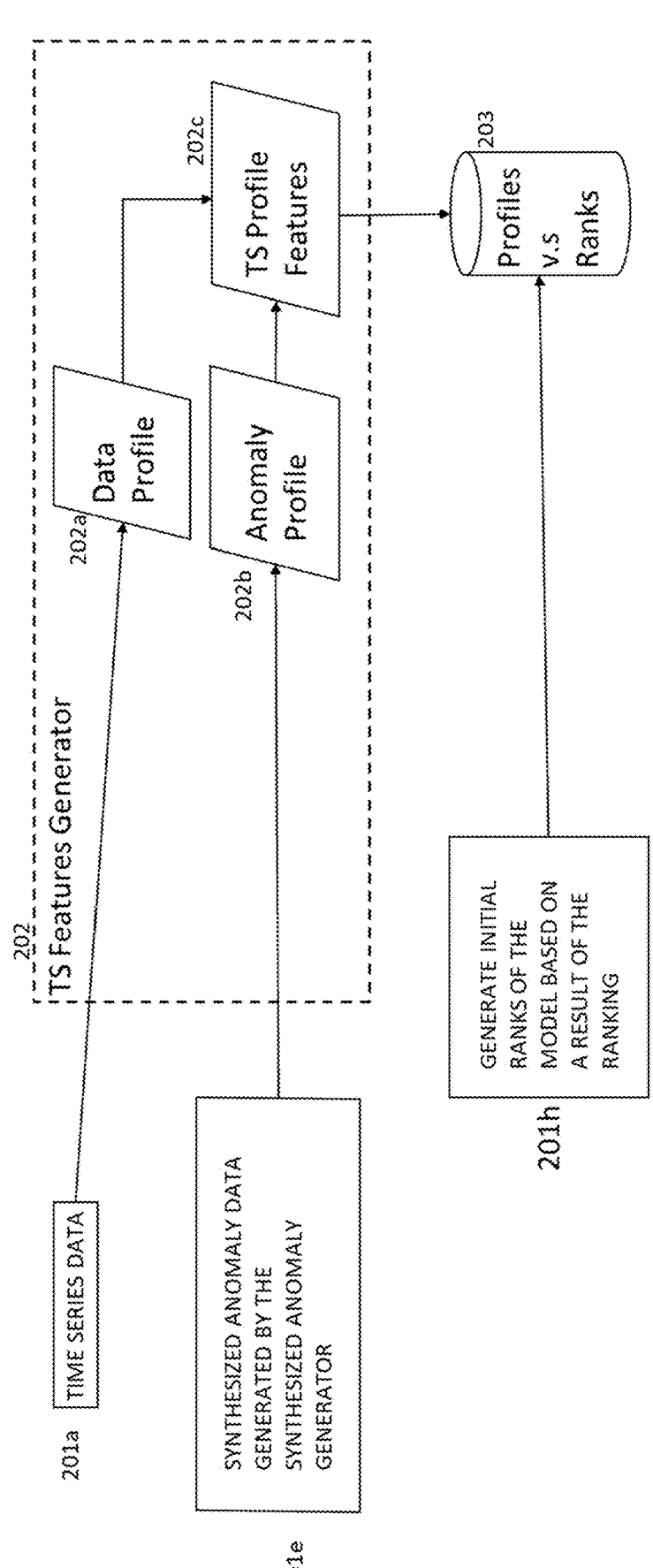
FIG. 5 exemplarily depicts a high-level flow chart for step 202 of the method 200 according to an embodiment of the present invention.

The invention will now be described with reference to FIGS. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the exemplary method 200 depicted in FIG. 2, the invention may include various steps for a time series anomaly detection technique that can improve models' selection performance and solve the bias problem of the synthesized ranking.

Conventional approaches for detecting anomalies include the utilization of semi-supervised methods. These conventional techniques involve constructing a model using normal data, allowing it to discern patterns representative of normalcy. Subsequently, the model proceeds to predict each new data point individually. Should any of these points deviate from the established normal pattern, it is classified as an anomaly.

However, during the model building phase, it is customary to create multiple models using normal data. These models are subsequently estimated using a dataset that encompasses both normal and randomly generated abnormal points that is usually synthesized against normal data for various anomaly types.

After that, the models that demonstrate the highest proficiency in detecting abnormal points, or anomalies, are chosen for further consideration.

Therefore, the conventional techniques have the problem that the time performance may be a big challenge particularly in a situation such as lots of candidate models with a bounty of anomaly types and model evaluation metrics. Another issue is that the model ranking based on the synthetic outliers may be biased. If so, then they should be optimized with the real rankings properly.

In view of this, the inventors have considered a technical solution to provide a time series anomaly detection technique that can improve models' selection performance and solve the bias problem of the synthesized ranking by absorbing profiles of time series data and anomaly types as features, optimizing biased ranks through merging initial ranks with the ones generated by real anomalies, auto-suggesting the optimized ranks for saving a predetermined (large) amount of data operations, and improving both speed and accuracy of models' selection by applying ranks auto-suggestions.

The time series anomaly detection method 200 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference generally to FIGS. 1-9, by establishing and utilizing a relationship between time series data profiles and model ranks, a predetermined (i.e., large) number of data operations are reduced, and the model selection performance is greatly improved. Also, as a result of the method 200, accuracy of models' selection is improved by applying the optimized ranks for model evaluations. Further, as time series data and anomalies were involved in the model selection process, model interpretation was greatly improved and trust in the model was enhanced. And, because the invention utilized merging of synthetic ranks and real ranks, bias in model building process can be solved and/or reduced.

With reference to FIG. 2 and method 200, the invitation includes a time series anomaly detection method that can improve models' selection performance and solve the bias problem of the synthesized ranking.

In step 201, initial ranks of a model are generated by synthesized anomalies.

Ranks are a numerical value calculated from basic metrics to measure models' performance. Higher ranking values indicate better performance. Therefore, the ranking can be used to select the best model. It is noted that the term "initial" is used to distinguish the rank from the later "new" ranks.

In the context of anomaly detection, one may need to train and test anomaly detection algorithms on datasets that contain both normal and anomalous data. Sometimes, real-world anomalous data is scarce or sensitive, so one needs to create synthetic anomalies to augment the dataset for training and evaluation purposes.

There are many methods for generating synthesized anomalies. For example, the invention can use applying data transformations like Fourier or Wavelet transformations to the data and introduce anomalies in the transformed space, and then inverse-transform to obtain synthetic anomalies in the original data space.

In step 202, time series data and anomalies of a model are profiled as features (e.g., features refer to the variables or attributes used to represent the data that the model will learn from).

That is, profiles are absorbed of the time series data and anomaly types of a model as features.

In the context of the invention, anomalies refer to data points or instances that deviate significantly from the expected or "normal" behavior within a dataset. They are genuine observations that reflect unexpected or unusual behavior, errors, fraud, defects, or other noteworthy events in the real world.

Also, synthetic anomalies are artificially generated or manufactured anomalies that are intentionally added to a dataset. They are created for purpose to test and evaluate the performance of anomaly detection algorithms. These anomalies are not naturally occurring and are introduced for experimental or testing purposes.

In step 203, a relationship between the generated initial ranks using the synthesized anomalies and the profiled time series data using the anomalies are stored. For example, the profiled time series data are the data records of the features defined in step 202. FIG. 7 exemplarily depicts a table of real examples of profiled time series data. The relationship is a kind of key-value pair where the key is profiles, and the value is the initial rank. Through the key, the value can be found.

In step 204, new ranks are generated. Then, the generated initial ranks in step 201 are merged with the new ranks to create optimized ranks. The new rank is the rank generated from the process defined in FIG. 8 in which one can see the real anomaly data 204c is used there. "Optimized" for optimized ranks means the rank gets better compared to the initial rank because it is generated by merging the initial rank and new rank.

For example, biased ranks are optimized to create optimized ranks through merging initial ranks with new ranks generated by real anomalies.

In step 205, the optimized ranks are suggested for selecting top N models, with N being an integer. The optimized ranks can be auto-suggested for saving a predetermined (large) amount of data operation.

With reference to flowchart 300 in FIG. 3 that depicts step 201 of method 200 in detail, in sub-step 201a, time series data is input into step 201. In sub-step 201b, time series anomaly detection (TSAD) models are built with the time series data. In sub-step 201c, the TSAD models that are built are input into sub-step 201f described later.

It is noted that time series anomaly detection (TSAD) is the process of identifying unusual or unexpected patterns, events, or data points within a time series dataset. Time series data incudes observations or measurements taken at sequential time intervals, thereby making it particularly valuable for tasks such as monitoring, forecasting, and anomaly detection in various domains, including finance, manufacturing, energy, and healthcare.

Sub-step 201d includes utilizing a synthesized anomaly generator. It is noted that the "synthesized anomaly generator" refers to structure that can perform the process to generate synthesized anomalies.

In sub-step 201e, the synthesized anomaly data generated by the synthesized anomaly generator is input into sub-step 201f.

In sub-step 201f, the models are evaluated based on the TSAD models from sub-step 201c and the synthesized anomaly data from sub-step 201e.

Model evaluation is the process of assessing the performance and effectiveness of a model to determine how well it performs on a particular task or dataset. The goal of model evaluation is to understand how accurately the model makes predictions or classifications and to identify any potential issues or areas for improvement. It is a critical step in the development of machine learning models as it helps in selecting the best model, fine-tuning its parameters, and ensuring its suitability for the intended task.

Model evaluation is an iterative process, and it may involve refining the model, adjusting hyperparameters, or collecting additional data to improve performance. The choice of evaluation metrics and techniques should align with the specific goals and characteristics of the machine learning task.

In sub-step 201g, the models are ranked based on a result of the evaluation in sub-step 201f. Rank examples 400 are depicted in FIG. 4.

In sub-step 201h, the initial ranks of the model are generated based on a result of the ranking in sub-step 201g. The initial ranks are based on the synthesized anomalies.

With reference to flowchart 500 in FIG. 5 that depicts step 202 of method 200 in detail, in sub-step 202a, a data profile is generated via the time series features generator. Data profile refers to a summary or overview of a dataset's key characteristics, statistics, and properties.

Figure 6:
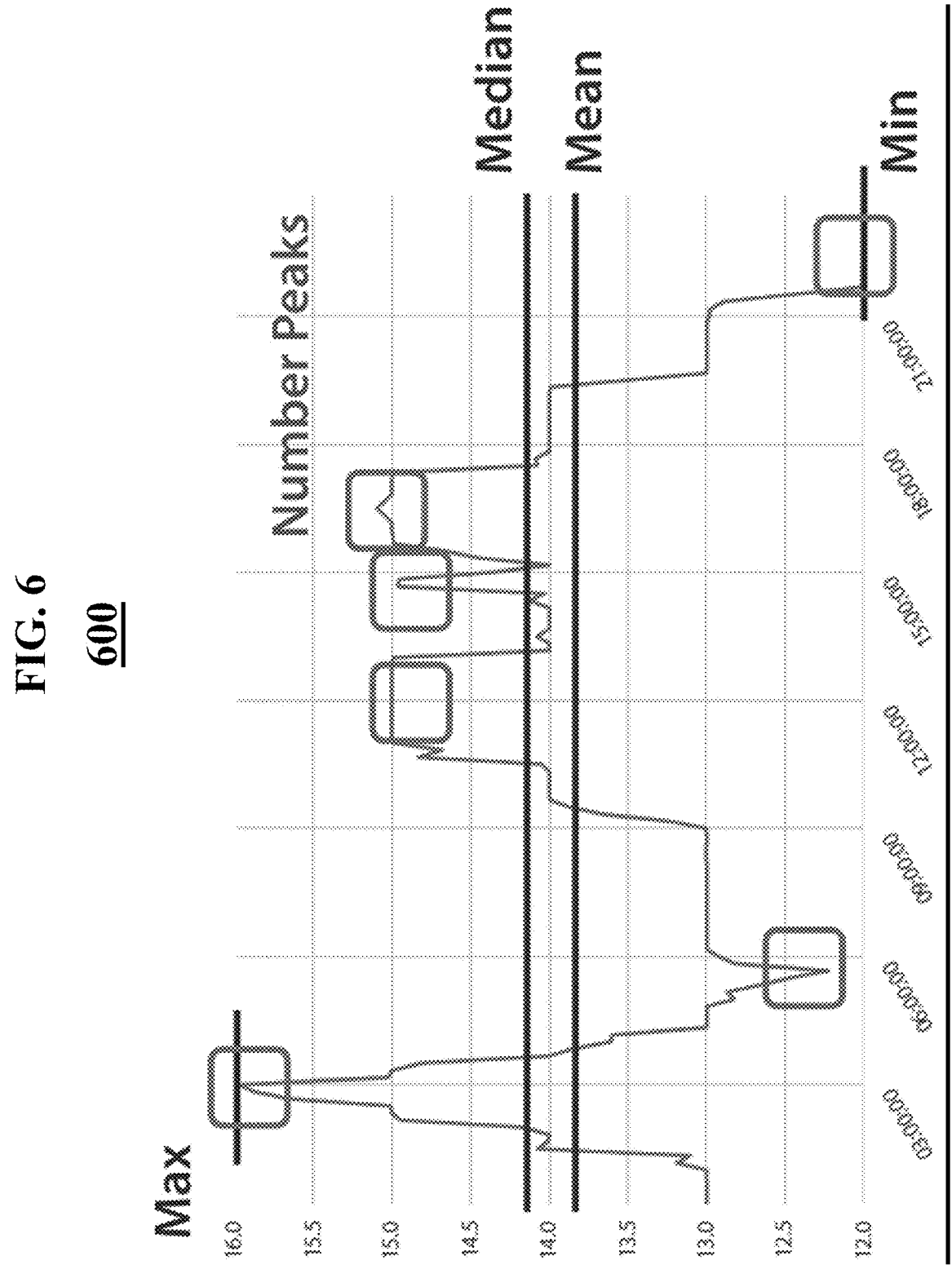
FIG. 6 exemplarily depicts features that describe time series according to an embodiment of the present invention.

To extract features that describe basic characteristics of the time series such as the number of peaks, the average or maximal value or more complex features such as the time reversal symmetry statistic may be used such as shown in element 600 of FIG. 6.

In sub-step 202b, an anomaly profile is created based on the synthesized anomaly data generated in sub-step 201e. The anomaly profile is a summary or description of the characteristics and properties of anomalies or outliers within a dataset.

That is, the anomaly profile includes pre-defined anomaly types that are incorporated as features, such as 'LocalizedExtreme', 'LevelShift', 'Variance', 'Trend', . . . , etc. (e.g., such as depicted in element 700 of FIG. 7).

In sub-step 202c, time series profile features are created based on the anomaly profile and the data profile. Time series profile features are based on actual anomalies with the data rather than the synthesized anomalies in step 201. For example, this is seen based on the different inputs to 201d in FIGS. 3 and 204c in FIG. 8.

As shown in FIG. 5, step 203 stores a relationship between the profiles including the time series profile features and the initial ranks. Therefore, the invention in step 203 stores a relationship between synthesized anomalies and actual anomalies with the time series data.

Figure 8:
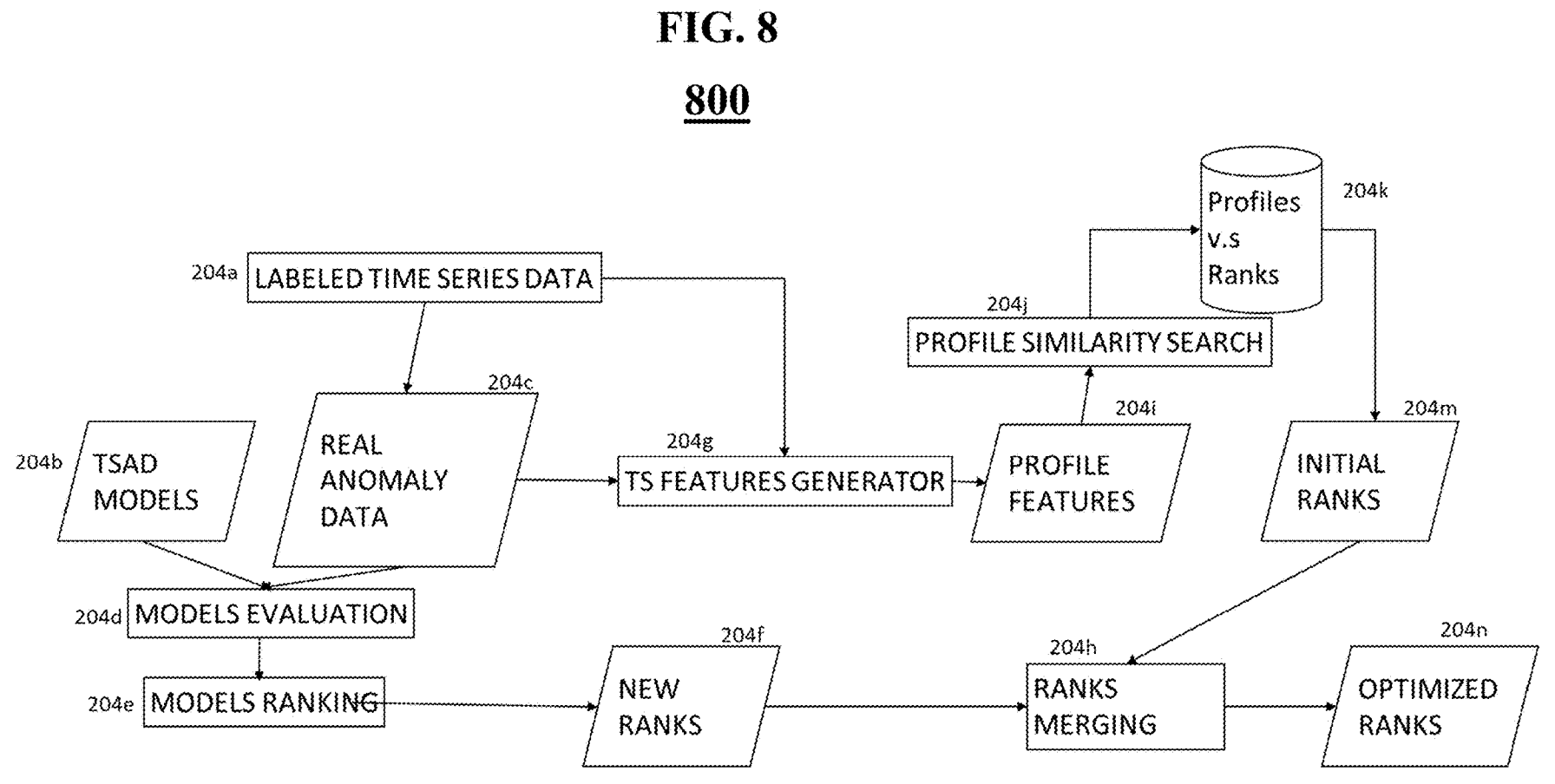

With reference generally to flowchart 800 in FIG. 8 that depicts step 204 of method 200 in detail, step 204 generates new ranks 204f and merges the new ranks 204h with the initial ranks 204m to obtain optimized ranks 204n.

Step 204 includes having labeled time series data 204a which is utilized to extract real anomaly data 204c and to use within the time series features generator 204g.

The real anomaly data 204c is used with the TSAD models 204b (as discussed above) for model evaluation 204d to determine model rankings 204. From the model rankings, new ranks 204f are determined.

The TS features generator 204g generates profile features 204i. A profile similarity search 204j may be performed based on the profile feature(s) 204i that defines similarity strength using a technique like nearest neighbor, etc. The similarity search finds out the similar profile via a given one. These are input into the profiles vs. ranks 204k database. It is performed by the similarity search algorithm that is a computational technique used to find the most similar item in a dataset to a given query item or target item. It is noted that the search results are stored in a database for future use.

To merge the ranks in step 204h, step 204 defines a score for merging ranks that is calculated based on an aggregation of the optimized metric (e.g., average precision) values for all supported anomaly types. The scores for each pipeline are ranked, using the Borda count method, and then weighted for their contribution to the aggregate score. Unlike a standard metric score, this value is not between 0 and 1. A higher value indicates a stronger score. Based on this, the initial and new ranks are merged as an optimized rank.

The new rankings obtained from the real anomalies are merged with the initial rankings generated by the synthetic anomalies, which can eliminate or attenuate the bias caused by the initial rankings.

Figure 9:
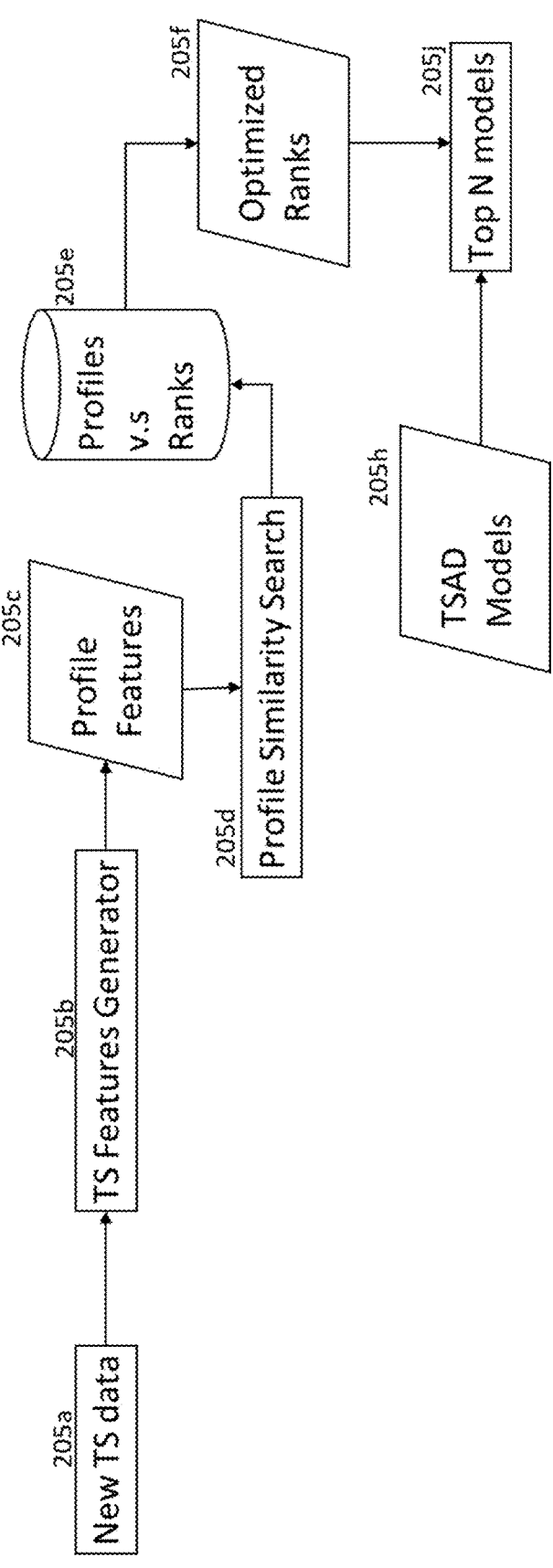
FIG. 9 exemplarily depicts a high-level flow chart for step 205 of the method 200 according to an embodiment of the present invention.

With reference generally to flowchart 900 in FIG. 9 that depicts step 205 of method 200 in detail, step 205 suggest optimized ranks for selecting top N models quickly.

In step 205, new time series data 205a is input to determine a model (top N models) to work with the new time series data 205a. Using the time series data, the time series feature generator 205b generates profile features 205c which are then used in a profile similarity search 205d against the database 205e with the profiles vs. ranks. From here, optimized ranks 205f are output which can be used to determine top N models 205j of the TSAD models 205h.

Step 205 can include selecting top m models from n candidates where m can be a threshold determined by an end-user.

Exemplary Aspects, Using a Computing Environment

With reference now to FIG. 1, computing environment 100 contains an example of an environment for the execution of at least some of the computer code involved in performing the inventive methods, such as time series anomaly detection code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented time series anomaly detection method that processes time series data in order to provide improved model selection performance and reduced model bias, the method comprising:

generating initial ranks of a model utilizing synthesized anomalies in time series data;

profiling time series data and anomalies of a model as features;

generating new ranks with real anomalies in time series data;

optimizing biased ranks to create optimized ranks through merging the initial ranks with new ranks generated by real anomalies; and auto-suggesting the optimized ranks for saving a predetermined amount of data operations, the optimized ranks used for selecting top N models, where N is an integer.

2. The computer-implemented time series anomaly detection method of claim 1, further comprising generating synthesized anomaly data by profiling the time series data of the model and the anomaly types.

3. The computer-implemented time series anomaly detection method of claim 1, wherein, during the optimizing, a relationship between the generated initial ranks and the profiled time series data of the model is stored.

4. The computer-implemented time series anomaly detection method of claim 1, wherein a value of N is set by a user.

5. The computer-implemented time series anomaly detection method of claim 1, embodied in a cloud-computing environment.

6. A time series anomaly detection computer program product that processes time series data in order to provide improved model selection performance and reduced model bias, the time series anomaly detection computer program product comprising a computer-readable storage medium having program instructions embodied therewith, the program instructions executable by a computer to cause the computer to perform:

generating initial ranks of a model utilizing synthesized anomalies in time series data;

profiling time series data and anomalies of a model as features;

generating new ranks with real anomalies in time series data;

optimizing biased ranks to create optimized ranks through merging the initial ranks with new ranks generated by real anomalies; and auto-suggesting the optimized ranks for saving a predetermined amount of data operations, the optimized ranks used for selecting top N models, where N is an integer.

7. The time series anomaly detection computer program product of claim 6, further comprising generating synthesized anomaly data by profiling the time series data of the model and the anomaly types.

8. The time series anomaly detection computer program product of claim 6, wherein, during the optimizing, a relationship between the generated initial ranks and the profiled time series data of the model is stored.

9. The time series anomaly detection computer program product of claim 6, wherein a value of N is set by a user.

10. A time series anomaly detection system that processes time series data in order to provide improved model selection performance and reduced model bias, the time series anomaly detection system comprising:

a processor; and a memory, the memory storing instructions to cause the processor to perform:

generating initial ranks of a model utilizing synthesized anomalies in time series data;

profiling time series data and anomalies of a model as features;

generating new ranks with real anomalies in time series data;

optimizing biased ranks to create optimized ranks through merging the initial ranks with new ranks generated by real anomalies; and auto-suggesting the optimized ranks for saving a predetermined amount of data operations, the optimized ranks used for selecting top N models, where N is an integer.

11. The time series anomaly detection system of claim 10, further comprising generating synthesized anomaly data by profiling the time series data of the model and the anomaly types.

12. The time series anomaly detection system of claim 10, wherein, during the optimizing, a relationship between the generated initial ranks and the profiled time series data of the model is stored.

13. The time series anomaly detection system of claim 11, wherein a value of N is set by a user.

14. The time series anomaly detection system of claim 10, embodied in a cloud-computing environment.

15. The computer-implemented time series anomaly detection method of claim 1, wherein ranks are numerical values calculated from basic metrics to measure model performance.

\* \* \* \* \*